United States Patent
Grinshpun et al.

(10) Patent No.: US 7,920,523 B2
(45) Date of Patent: Apr. 5, 2011

(54) METHOD OF SUPPORTING QUALITY-OF-SERVICE APPLICATION SESSION CONTINUITY DURING INTER-TECHNOLOGY HANDOVER USING A COMMON PACKET DATA FUNCTION

(75) Inventors: Edward Grinshpun, Freehold, NJ (US); Chung Zin Liu, Naperville, IL (US); E-Ling Lou, Naperville, IL (US); Harinath Rachapalli, WoodRidge, IL (US); Lily Zhu, Parsipanny, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 724 days.

(21) Appl. No.: 11/970,169

(22) Filed: Jan. 7, 2008

(65) Prior Publication Data

US 2009/0175239 A1    Jul. 9, 2009

(51) Int. Cl.
*H04W 4/00* (2009.01)
*H04W 36/00* (2009.01)
*H04L 12/56* (2006.01)

(52) U.S. Cl. ............ 370/331; 370/338; 370/395.2; 455/436

(58) Field of Classification Search .......... 370/328–334; 455/432.1–444; 709/227–229, 249
See application file for complete search history.

(56) References Cited

U.S. PATENT DOCUMENTS

| | | | |
|---|---|---|---|
| 7,009,952 B1 * | 3/2006 | Razavilar et al. | 370/331 |
| 7,187,923 B2 * | 3/2007 | Mousseau et al. | 455/416 |
| 7,738,873 B2 * | 6/2010 | Jagadeesan et al. | 455/436 |
| 2008/0176569 A1 * | 7/2008 | Jung et al. | 455/436 |
| 2008/0254797 A1 * | 10/2008 | Achtari et al. | 455/436 |
| 2009/0141683 A1 * | 6/2009 | Grinshpun et al. | 370/331 |

* cited by examiner

*Primary Examiner* — Tri H Phan
(74) *Attorney, Agent, or Firm* — Williams Morgan & Amerson, P.C.

(57) ABSTRACT

The present invention provides a method of handing off a mobile unit that supports multiple quality-of-service (QoS) application layer clients that operate according to multiple wireless access technologies in a packet-switched communication system. The method includes receiving information indicating a request to hand off the mobile unit from a first access network that operates according to a first wireless access technology to a second access network that operates according to a second wireless access technology. The mobile unit established a first session according to the first wireless access technology at a first QoS level. The method also includes establishing, concurrently with the first session and in response to receiving the handoff request, a second session according to the second wireless access technology at the first QoS level. The method further includes communicating with the mobile unit at the first QoS level using the first and second sessions.

18 Claims, 4 Drawing Sheets

METHOD OF SUPPORTING QUALITY-OF-SERVICE APPLICATION SESSION CONTINUITY DURING INTER-TECHNOLOGY HANDOVER USING A COMMON PACKET DATA FUNCTION

CROSS REFERENCE TO RELATED APPLICATIONS

This application is related to U.S. application Ser. No. 11/943,085 filed Nov. 20, 2007, entitled "Method of Call Conference to Support Session Continuity for Multi-Mode Clients" and U.S. application Ser. No. 11/948,248 filed Nov. 30, 2007, entitled "Method of Best Effort Handoff to Maintain Radio Bearer and MIP Session Continuity for Multi-Mode Mobile Units."

BACKGROUND OF THE INVENTION

1. Field of the Invention

This invention relates generally to communication systems, and, more particularly, to wireless communication systems.

2. Description of the Related Art

Conventional wireless communication systems provide wireless connectivity using base stations or other wireless entities such as access points, base station routers, and the like. For example, a mobile unit may establish a wireless communication link over an air interface with a base station that is a communicatively coupled to a network. The mobile unit may use the wireless communication link to access services provided by the network such as establishing a communication session with another mobile unit. The information transmitted using the communication session between the two mobile units may be analog or digital information and the communication path between the mobile units may be formed using a circuit-switched architecture or a packet-switched architecture. In a circuit-switched architecture, a dedicated communication path is formed between the two mobile units and may only be used by the two mobile units. In contrast, packet-switched architectures divide the information up into packets that can be transmitted along numerous paths between the two mobile units using a common packet network infrastructure for forwarding the packets between the mobile units and their network peers. Thus, some or all of the paths through a packet-switched network infrastructure may be shared by other mobile units or other entities coupled to the packet-switched network such as a network server or a fixed subscriber.

Voice over Internet Protocol (VoIP) is a technique for encoding audio signals (such as voice signals) into a digital format that can be used to form packets for transmission over a packet-switched network. The VoIP packets are typically referred to as delay-intolerant information because large delays between successive packets at the destination VoIP session peer (e.g., a mobile unit) may degrade the quality of the audio signal produced by the source peer. Consequently, VoIP applications are typically constrained to provide VoIP packets at a selected quality-of-service (QoS) level. For example, a VoIP application implemented in a mobile unit may be required to maintain minimum levels of delay, latency, and the like for packets transmitted over the network. In some cases, customers may pay larger fees to obtain overall higher QoS levels of higher QoS levels for certain applications.

Numerous wireless access technologies may be used to support packet data applications. Some exemplary wireless access technologies include second generation (2G), third generation (3G), and fourth generation (4G) technologies such as 1x-EVDO, UMTS and WIMAX. These wireless access technologies operate according to standards and/or protocols such as the standards and/or protocols established by the Third Generation Partnership Project (3GPP, 3GPP2) and WiMAX Forum Network Working Group (NWG). To take advantage of the diversity of wireless access technologies, equipment vendors are developing and deploying dual mode (or multi-mode) mobile units that are capable of communicating using multiple wireless access technologies. For example, a dual-mode mobile unit may implement two independent means of IP connectivity that operate according to two different wireless access technologies. At the same time, service providers are increasingly using more than one wireless access technology to provide wireless connectivity. For example, some service providers have deployed heterogeneous networks that include overlaid meshes that operate according to different access technologies. The overlaid meshes may be used as part of an evolution from a legacy technology to a newer technology or for other reasons, such as reducing deployment and/or operating costs, improving the overall communication spectrum characteristics, and the like.

Individual mobile units may frequently handoff between base stations that operate according to different wireless access technologies as the mobile unit moves through a heterogeneous network. For example, a mobile unit may initially be using a wireless communication link formed according to the EV-DO standards and/or protocols for a VOIP call. The mobile unit may then determine that the signal quality of the EV-DO wireless communication link has degraded and may elect to handoff to a base station that operates according to the WIMAX communication standards and/or protocols. Conventional handoff protocols attempt to maintain seamless connectivity of the VoIP session as it is handed off from the fading EV-DO wireless communication link to the stronger WIMAX link.

Mobile Internet Protocol (MIP) is one proposed method for supporting mobility between different access technologies at IP level. Systems that implement MIP can support best-effort transmissions during handoff between different technologies because best-effort handoffs do not require application signaling. However, the QoS level is negotiated and maintained using higher levels and/or layers in the network, such as may be implemented in a packet data function (PDF) in a core IP Multimedia Sub-system (IMS) network. Conventional MIP handoffs do not address the interface between the radio access network (RAN), the application server, and the QoS policy functions in the core network (IMS). Thus, conventional handoff protocols do not maintain the QoS level of the call during the handoff of a QoS application and must default to best effort handoffs.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for handing off a mobile unit that supports multiple quality-of-service (QoS) application layer clients that operate according to multiple wireless access technologies in a packet-switched communication system. The method includes receiving information indicating a request to hand off the mobile unit from a first access network that operates according to a first wireless access technology to a second access network that operates according to a second wireless access technology. The mobile unit has established a first session according to the first wireless access technology at a first QoS level. The method also includes establishing, concurrently with the first session and in response to receiving the handoff request, a second session according to the second wireless access technology at the first QoS level. The method further includes communicating with the mobile unit at the first QoS level using the first and second sessions.

In another embodiment of the present invention, a method is provided for handing off a mobile unit from a source access network that operates according to a first wireless access technology to a target access network that operates according to a second wireless access technology. The mobile unit supports multiple quality-of-service (QoS) application layer clients that operate according to multiple wireless access technologies in a packet-switched communication system. The method includes providing, from the target access network, information indicating a request to establish a second session at a first QoS level. The request is provided in response to receiving information indicating a hand off of the mobile unit from the source access network to the target access network. The mobile unit has a first session established with the source access network according to the first wireless access technology at the first QoS level. The method also includes establishing, concurrently with the first session, the second session according to the second wireless access technology at the first QoS level and communicating with the mobile unit at the first QoS level using the second session concurrently with communications between the mobile unit and the source access network using the first session.

In yet another embodiment of the present invention, a method is provided for handing off a mobile unit from a source access network that operates according to a first wireless access technology to a target access network that operates according to a second wireless access technology. The mobile unit supports multiple quality-of-service (QoS) application layer clients that operate according to multiple wireless access technologies in a packet-switched communication system. The method includes communicating, from the source access network, with the mobile unit at the first QoS level using the first session concurrently with communications between the mobile unit and the target access network at the first QoS level using the second session. The method also includes providing, from the source access network, information indicating a request to release the first session. The request is provided in response to receiving information indicating completion of the hand off the mobile unit to the target access network.

BRIEF DESCRIPTION OF THE DRAWINGS

The invention may be understood by reference to the following description taken in conjunction with the accompanying drawings, in which like reference numerals identify like elements, and in which.

Figure 1:
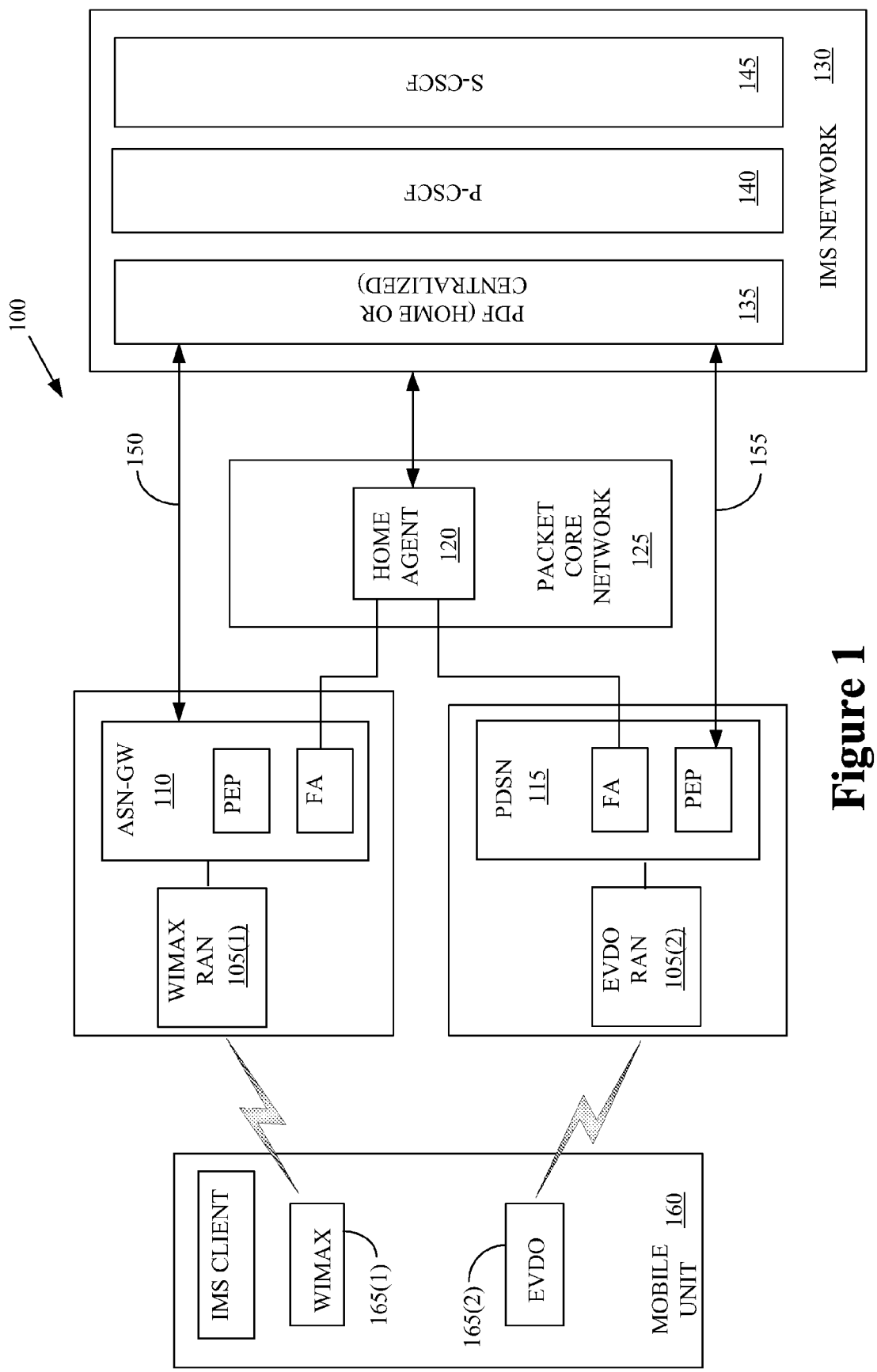
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 is implemented according to the reference architecture of the Client MIPv4-based model. Operation of the wireless communication system 100 will be described herein in the context of the reference architecture of the Client MIPv4-based model. However, persons of ordinary skill in the art having benefit of the present disclosure should appreciate that the exemplary embodiment is intended to be illustrative and not to limit the present invention to this particular reference architecture and protocols. In alternative embodiments, other reference architectures including other functional entities may also be used to describe and/or implement the wireless communication system 100. Furthermore, portions of the wireless communication system 100 may operate according to various standards and/or protocols including the standards and/or protocols defined by the Third Generation Partnership Project (3GPP, 3GPP2) such as Universal Mobile Telecommunication Services (UMTS), Evolved Data-Optimized (EV-DO), WIMAX, and the like. However, persons of ordinary skill in the art having benefit of the present disclosure should appreciate that the present invention is not limited to these exemplary standards and/or protocols. In alternative embodiments, portions of the wireless communication system 100 may operate according to any standards and/or protocols.

The wireless communication system 100 includes at least two separate access technology dependent radio access networks (RANs) 105. In the illustrated embodiment, the radio access networks 105 include a WIMAX RAN 105(1) that is coupled to an access serving network-gateway (ASN-GW) 110 that includes a policy enforcement point (PEP) and a foreign agent (FA). The radio access networks 105 also include an EVDO RAN 105(1) that is coupled to a packet data serving node (PDSN) 115 that includes a PEP and a foreign agent (FA). The foreign agents in the ASN-GW 110 and PDSN 115 can communicate with a home agent 120 located in a packet core network 125. In one embodiment, the home agent 120 can communicate with an IP multimedia subsystem (IMS) network 130 that includes a packet data function (PDF) 135, a proxy call session control function (P-CSCF) 140, and a serving call session control function (S-CSCF) 145. The ASN-GW 110 and the PDSN 115 can also communicate with the PDF 135 over interfaces 150, 155, respectively. Exemplary interfaces 150, 155 include R3 and Ty connections that can support diameter sessions, which are used to transport commands and data from entities in the IMS network 130 to mobile units that are in communication with the ASN-GW 110 and/or the PDSN 115.

Mobile unit 160 is a dual transceiver mobile unit 160 that can support multiple modems that operate according to different wireless access technologies. In the illustrated embodiment, the mobile unit 160 can implement two modems 165 that may be used to establish IP connectivity with the corresponding RAN 105. The first modem 165(1) operates according to the WIMAX wireless access technology and the second modem 165(2) operates according to the EVDO wireless access technology. Persons of ordinary skill in the art should appreciate that the WIMAX and EVDO access technologies are used as examples and are not intended to limit the present invention. In alternative embodiments, the techniques described herein could also be used to support interworking of packet data (BE or QoS) from other wireless access technologies. For example, the mobile unit 160 can have two or more modems 165 that operate according to different access technologies such as WiMAX, EVDO, GSM, WiFi, and the like. The mobile unit 160 may also support an IMS client 170 for maintaining call sessions with the IMS network 130. The IMS client 170 interworks with the IMS network 130 using a common PDF 135, P-CSCF 140, and S-CSCF 145.

The two independent modems 165 on the mobile unit 160 can establish independent call sessions according to their respective wireless access technologies. For example, a VoIP call may be established between the modem 165(1) and another mobile unit (not shown in FIG. 1) over a WiMAX connection. For another example, a VoIP call may be established between the modem 165(2) and another mobile unit (not shown in FIG. 1) over an EVDO connection. Connection management in the mobile unit 160 is triggered by detecting changes in the radio conditions over the WIMAX connection. In preparation for a hand-off to the EVDO link, the connection management function in the mobile unit 160 may initiate establishment of an EVDO link using modem 165(2) when the radio conditions over the WIMAX connection have deteriorated. Alternatively, a handoff of the call between the WiMAX and EV-DO connections may be initiated by the IMS network 130.

In the illustrated embodiment, the PDF 135 negotiates quality of service (QoS) parameters and/or levels with the IMS client 170. The PDF 135 is then responsible for maintaining the negotiated QoS level for call sessions established with the mobile unit 160 for the duration of a call. The PDF 135 maintains the negotiated QoS level on the call session is handed off between different modems 165 and radio access networks 105 by establishing concurrent diameter sessions over the interfaces 150, 155 during the handover period. The concurrent diameter sessions support the negotiated QoS levels for communication with the respective RANs 105 and modems 165. For example, when a MIP handoff trigger indicating a handoff from the EV-DO RAN 105(2) to the WiMAX RAN 105(1) is generated by either the mobile unit 160 or the network 130, the ASN-GW 110 requests a connection over the R3 interface 150 using an existing diameter CCR/CCA command that includes either a network access identifier (NAI) or an IP address of the mobile unit 160, as well as a handoff indicator. The PDF 135 that the requested new R3 parameter session then binds the session with the existing Tx-based session established over the interface 155. Binding of the two sessions is done based on the common NAI and/or IP address of the mobile unit 160. A Ty diameter session already exists over the interface 155.

After the requested R3 parameter session has been set up, the PDSN 115 can release the Ty diameter session by transmitting diameter CCR/CCA commands that include a termination operation indicator. In response to receiving the request to terminate the Ty diameter session, the PDF 135 may release the Ty diameter session with the existing Tx using the NAI or IP address of the mobile unit. In one embodiment, the old diameter session ID may optionally be passed from the PDSN 115 to the ASN-GW 110. In that case, the ASN-GW 110 can provide the session identifier to the PDF 135 to maintain the corresponding session until the handoff is complete. This technique does not require any connection or interface between the PDSN 115 and the ASN-GW 110.

Figure 2:
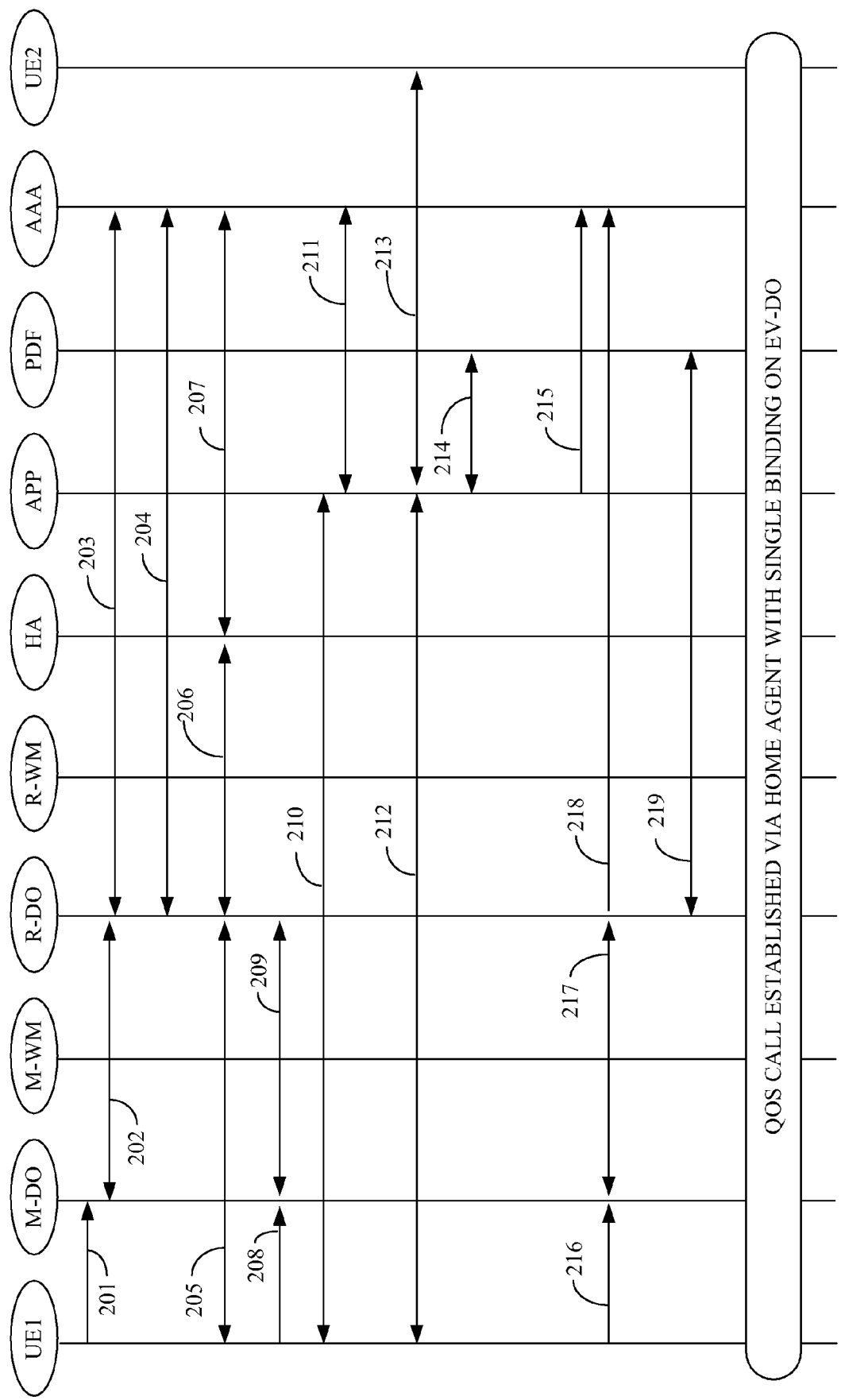
FIGS. 2, 3, and 4 conceptually illustrate portions of one exemplary embodiment of a method of handing off a mobile unit between different wireless access technologies, in accordance with the present invention.
Figure 3:
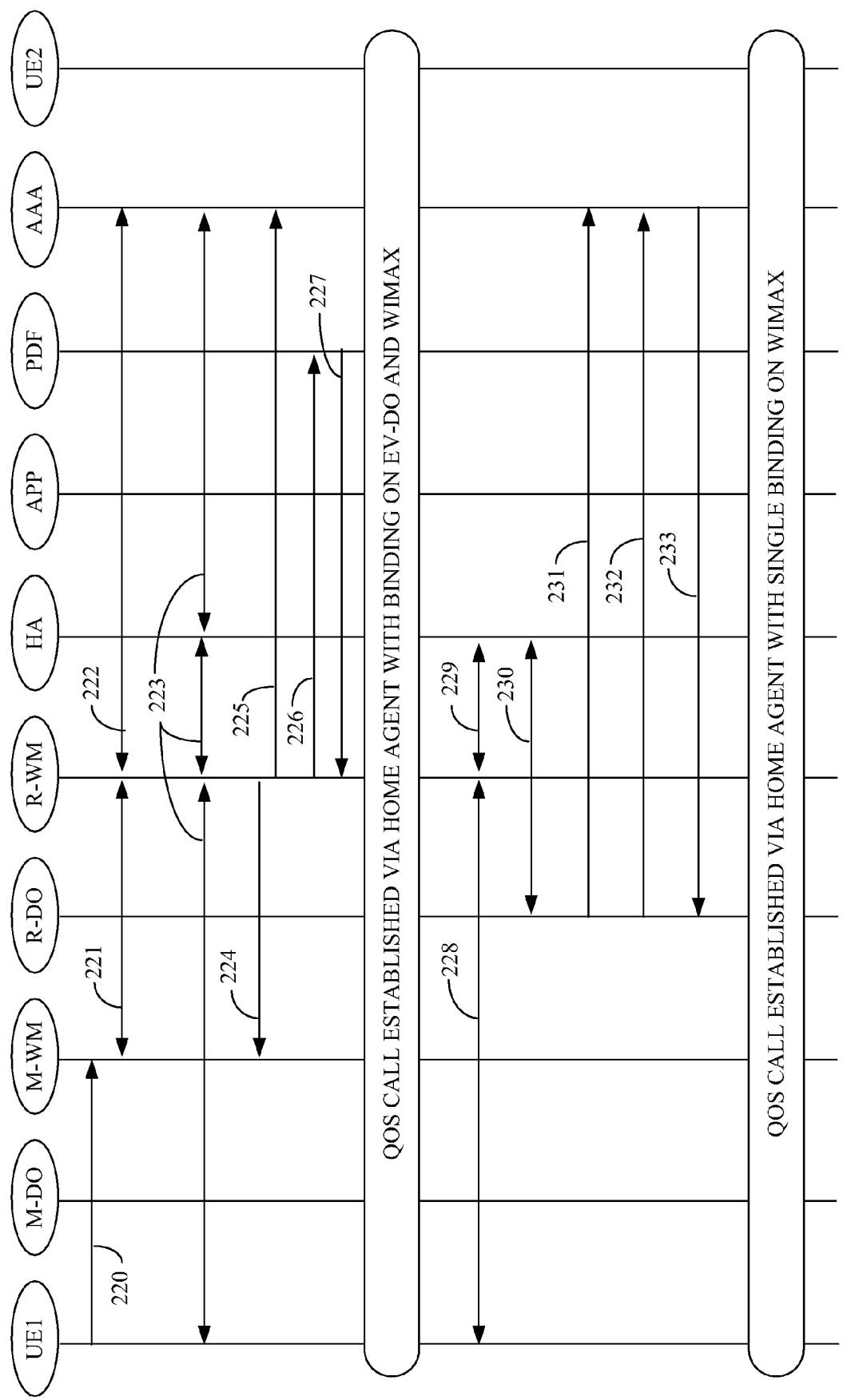
Figure 4:
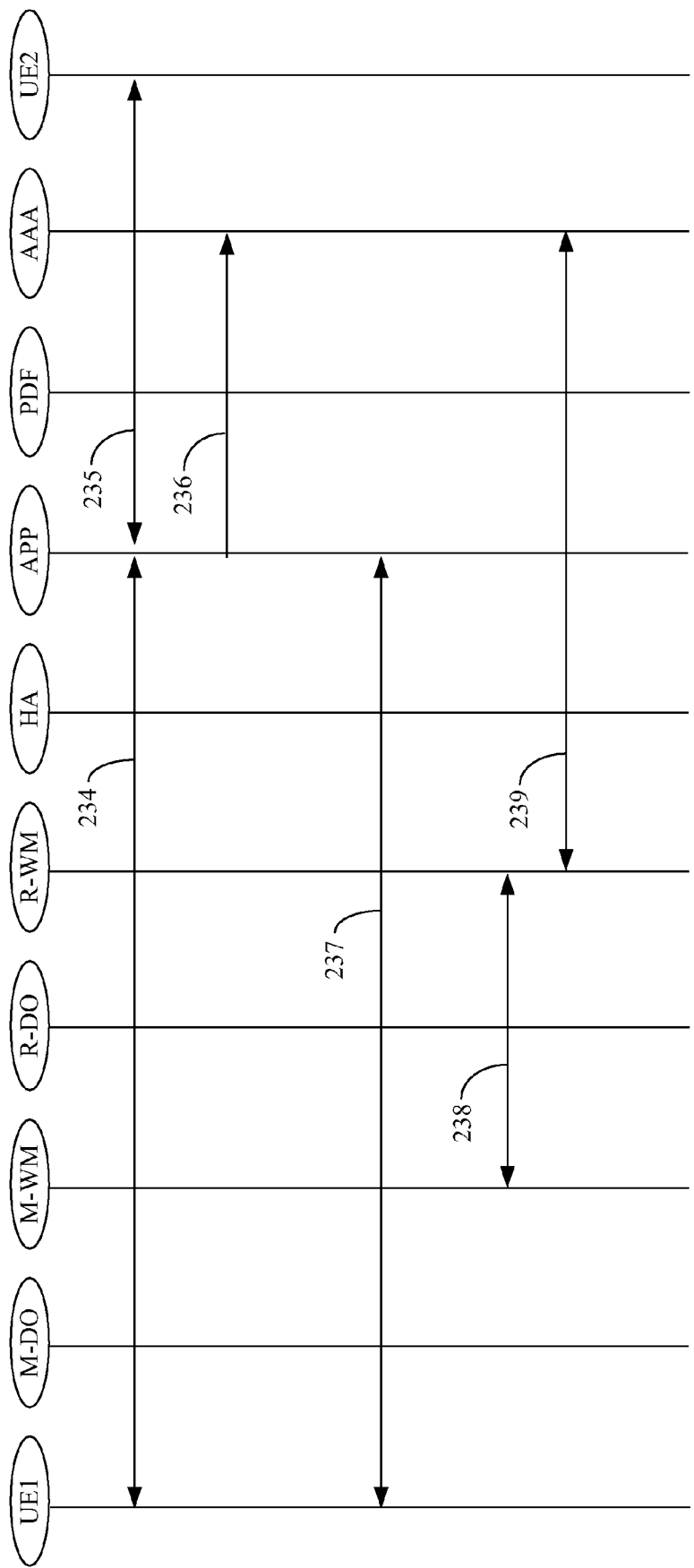

FIGS. 2, 3, and 4 conceptually illustrate portions of one exemplary embodiment of a method of handing off a mobile unit between different wireless access technologies. In the illustrated embodiment, the wireless communication system includes a first mobile unit (user equipment, UE1). The mobile unit (UE1) contains three parts: a client that handles applications and the related signaling (e.g., the client may be a SIP and/or IMS client), an EV-DO modem (M-DO) that handles EVDO air interface connections, and a WiMAX modem (M-WM) that handles WiMAX air interface connections. Both of these modems contain standard functions as stand-alone devices to support the corresponding air interfaces. The client contains traditional applications that are supported at the mobile unit as well as an intelligent mobile connection manager that supports simultaneous CMIP binding during the inter-technology handoff period. The intelligent mobile connection manager performs operations such as determining when to initiate a handoff, selecting from among duplicate packets transmitted by concurrent sessions when simultaneous binding is in effect, and the like.

The wireless communication system also includes radio access networks (R-DO, R-WM) that operate according to the EV-DO and WiMAX wireless access technologies. The EV-DO radio access network handles radio access network signaling and bearer control, as well as including the PDSN function, which has the routable IP interface to the home agent (HA) and supports interfaces to the IMS network and the accounting, authorization, and authentication (AAA) server. The home agent (HA) functions as the MIP endpoint and all bearer data and application signaling for the EV-DO and WiMAX sessions goes through the home agent. The application server (APP), which also includes the various CSCF functionalities, supports the IMS components for multimedia support. The AAA server, which also includes HSS functionality, supports authentication of the user, the device, and/or the associated QoS profiles. The AAA server may also support MIP authentication by providing the mobile-node-home-agent (MN-HA) key. The other end user (UE2) depicted in the figures is the other end of a VoIP call service that may talk to the same or different access network using VoIP. In one alternative embodiment, a public switched telephone network (PSTN) user may also be addressed using the techniques described herein, but this approach may utilize additional components in the IMS core network to support a media gateway.

Referring now to FIG. 2, the first mobile unit powers up and the communication application in the mobile unit elects to register with the EV-DO interface by transmitting a signal to the EV-DO modem (at step 201). The EV-DO modem and the EV-DO radio access network then exchange air interface messages to establish a DO UATI session using the Session Configuration Protocol (IS-835-A), at step 202. In the illustrated embodiment, the wireless communication system implements terminal authentication and so the EV-DO radio access network communicates with the AAA server to perform terminal authentication based upon the mobile unit's international mobile subscriber identity (IMSI), at step 203 and 204. However, persons of ordinary skill in the art having benefit of the present disclosure should appreciate that terminal authentication is optional feature that may not be implemented in all embodiments. The mobile unit and the EV-DO radio access network then exchange link control protocol (LCP) and IP control protocol (IPCP) messages to establish a point-to-point protocol (PPP) session, at step 205. The PPP negotiation triggers the PDSN to send a MIP foreign agent (FA) advertisement over the EV-DO air interface using the EV-DO modem, which delivers a message to the MS MIP client, at step 206. In embodiments that utilize authentication, the home agent and the AAA server may communicate to perform authentication using the MN-HA key, at step 207.

The MS client instructs the access terminal to begin configuring the communication application, which in this case is a VoIP application, and negotiating parameters for the communication application, at step 208. The mobile unit may then initiate QoS negotiation with access network to negotiate parameters and profiles such as the supported QoS profiles of both the mobile unit and the access network, at step 209. The mobile unit may also send (at step 209) a Traffic Filter Template (TF) via RSVP-like protocol (Resv) to the PDSN using a best effort connection. At this point, all QoS reservations (IP flows) are established. Some flows (such as best effort and Media Control Signaling) are in the open state. Some flows (such as VoIP, Video) are in idle state. Based on pre-programmed P-CSCF IP addresses and the current access technology (EVDO), a SIP registration is performed (at step 210) by the mobile unit (triggered by the VoIP application) with the P-CSCF (within the SBC) using MCS flow over the air interface (e.g., via the AT-AN-PDSN-HA-CSCF/AS). The CSCF retrieves user profile from the HSS in the AAA server (at step 211) and then the VoIP call starts at step 212. An SIP signaling exchange may be performed between the mobile unit's VoIP client and the CSCF over the MCS flow (including SIP INVITE/SDP offer, answering, SIP 200 OK, ACK, etc.). The CSCF may exchange SIP signaling with the other end user and the originator to complete the SIP call setup signaling, at step 213.

The negotiated QoS profiles or other information may then be transmitted to the PDF. In the illustrated embodiment, the P-CSCF passes service layer QoS info to the PDF at step 214. The P-CSCF may also trigger the HSS/AAA server to begin an IMS accounting record associated with the VoIP call, at step 215. The mobile unit application may then activate the QoS flow, at step 216, and perform QoS activation for the VoIP flow, at step 217. The access network may also perform admission control and allocate the radio resources for the call. If not already in place, the access network may also activate A10s with the PDSN. The PDSN then sends another "Accounting start" for the QoS flow, at step 218. The PDSN may then send a request for QoS authorization to the PDF and bind the Tx interface from the P-CSCF, at step 219. At this point, QoS packets associated with the application can be exchanged between the user and the Internet via the home agent, i.e., the QoS packets are exchanged using a single home agent binding.

Referring now to FIG. 3, the mobile unit intelligent connection manager decides to handoff to Wimax technology based on its own signal strength measurement and sends the HO trigger to Wimax modem, at step 220. The Wimax RAN connection setup is performed by mobile unit initial ranging, device authentication, user authentication, capability exchange, and establishment of primary and basic management connections, at step 221. During the Wimax connection setup, EAP authentication is performed with AAA server(s), at step 222. In the illustrated embodiment, the mobile unit's NAI is used for the EAP authentication. The Wimax RAN then sets up a basic connection to establish an IP connection (MIP) using conventional signaling, at step 223. The Wimax RAN sets up connection (service flow) in best effort mode for VoIP, at step 224 and the Wimax RAN sends an "Accounting start" message to the AAA server, at step 225.

Simultaneous MIP bindings are now established over the newly created WiMAX connection and the existing EV-DO connection. The ASN GW sends (at step 226) a CCR diameter command to trigger creation of a new R3/Gx diameter session with the PDF. The same NAI is used to bind new the R3 session with existing Rx/Tx session between the PDF and the P-CSCF. The PDF may be configured to allow concurrent connections using the EVDO PDSN and the WiMAX ASG GW based on a handoff indicator included in the CCR diameter command. The optional handoff indicator can be included in the R3 interface if Mobile IP is extended. The PDF returns existing QoS info for this session to ASG GW by CCA diameter command, at step 227. Recall that at this point MIP simultaneous bindings of the EV-DO and WiMAX sessions are established so that the home agent sends data packets to both the WiMAX radio access network and the EV-DO radio access network. Both of these RAN sessions implement the same QoS levels, which were negotiated when the call was initiated.

After receiving data concurrently from both the DO modem and the Wimax modem via the simultaneous binding at the home agent, the mobile unit intelligent mobility connection manager decides to switch to Wimax and abandon the DO air interface, at step 228. The mobile unit's intelligent mobility connection manager sends (at step 229) a MIP re-registration request (RRQ with WiMAX-based CoA and S-bit set to 0) to the home agent requesting that the home agent turn the simultaneous binding off. The home agent acknowledges the MIP RRQ with a MIP registration response (RRP). Upon receiving the MIP RRQ from the mobile unit MIP client, the home agent removes the binding with the EV-DO-based FA and exchanges (at step 230) MIP revocation messages with the DO PDSN to revoke the previous MIP session, which is the DO MIP session. The DO PDSN may then clear the DO MIP session, PPP session, and any RF connections if they still exist as specified in 3GPP2 standard (IS-835D). At this point PDSN sends an "Accounting stop" to the AAA server (at step 231) to stop accounting on both the default best effort flow and QoS bearer flow. It is possible to gracefully shutdown EVDO link at the end of the handover, but considering the handover situation where the mobile unit may not have good signal strength on the EVDO air interface, it is preferable that network not send any over-the-air message to the mobile unit to clean up the resource and that the PPP session at the mobile unit side can either time out or be torn down by the mobile unit client immediately.

The PDSN may send (at step 232) a CCR diameter command with termination as the indicator to release the new Ty diameter session with the PDF. After releasing PDF's connection to the EVDO PDSN, the PDF is only connected to the WiMAX ASG GW. The PDF returns (at step 233) an acknowledgement to ASG GW with CCA diameter command after release Ty connection. Handoff of the QoS call from the EV-DO wireless access technology to the WiMAX wireless access technology is now complete and data packets may be exchanged between the user and Internet via a single HA binding. The DO MIP session no longer exists. Continuity of the QoS call has been preserved by using the simultaneous binding of the WiMAX and EV-DO sessions (coordinated by the PDF) during the handoff.

Referring now to FIG. 4, when the VoIP call is over, the mobile unit client exchanges SIP signaling with P-CSCF to release SIP (Bye), at step 234. The P-CSCF exchanges the same SIP signaling with the other end user to tear down the VoIP call, at step 235, and the CSCF stops IMS accounting, at step 236. The mobile unit client performs SIP de-registration with EVDO's P-CSCF, at step 237, and the mobile unit client may then change the P-CSCF address based on pre-programmed information and the current access technology (Wimax). The mobile unit client may also perform SIP registration with the new P-CSCF to indicate availability of the mobile unit client. The mobile unit client then initiates the transition to idle mode by disconnecting the Wimax connection when it decides to transition to idle mode, at step 238, and the Wimax RAN sends an "Accounting stop" message to AAA server, at step 239.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method for implementation in a network that supports handing off a mobile unit that supports multiple quality-of-service (QoS) application layer clients that operate according to multiple wireless access technologies in a packet-switched communication system, comprising:
   receiving information indicating a request to hand off the mobile unit from a first access network that operates according to a first wireless access technology to a second access network that operates according to a second wireless access technology different than the first wireless access technology, the mobile unit having a first session established according to the first wireless access technology at a first QoS level;
   establishing, concurrently with the first session and in response to receiving the handoff request, a second session according to the second wireless access technology at substantially the first QoS level;
   communicating with the mobile unit at the first QoS level using the first and second sessions.

2. The method of claim 1, wherein receiving the information indicating the request to hand off the mobile unit comprises receiving information indicating the request from the mobile unit or receiving information indicating the request from an entity in the packet-switched communication system.

3. The method of claim 1, wherein receiving information indicating the request to hand off the mobile unit comprises receiving information indicating the request at a packet data function in the network of the packet-switched communication system.

4. The method of claim 1, wherein receiving information indicating the request to hand off the mobile unit comprises receiving, from the second access network, information requesting formation of the second session, the information including a handoff indicator and at least one of a network access identifier or an Internet address associated with the mobile unit.

5. The method of claim 4, wherein establishing the second session comprises binding the second session to the first session based upon at least one of the network access identifier or the Internet address associated with the mobile unit.

6. The method of claim 1, wherein communicating with the mobile unit at the first QoS level using the first and second session comprises mapping at least one first QoS parameter associated with the first wireless access technology to at least one second QoS parameter associated with the second wireless access technology.

7. The method of claim 1, comprising receiving information indicating a request to release the first session, the information including at least one of a network access identifier or an Internet address associated with the mobile unit.

8. The method of claim 7, comprising:
releasing the first session in response to receiving the information indicating the request to release the first session; and
communicating with the mobile unit at the first QoS level using the second session.

9. A method for handing off a mobile unit from a source access network that operates according to a first wireless access technology to a target access network that operates according to a second wireless access technology, the mobile unit supporting multiple quality-of-service (QoS) application layer clients that operate according to multiple wireless access technologies in a packet-switched communication system, comprising:
providing, from the target access network, information indicating a request to establish a second session at a first QoS level, the request being provided in response to receiving information indicating a hand off of the mobile unit from the source access network to the target access network, the mobile unit having a first session established with the source access network according to the first wireless access technology at the first QoS level;
establishing, concurrently with the first session, the second session according to the second wireless access technology at the first QoS level;
communicating with the mobile unit at the first QoS level using the second session concurrently with communications between the mobile unit and the source access network using the first session.

10. The method of claim 9, comprising receiving information indicating that the mobile unit or an entity in the packet-switched communication system has requested the handoff.

11. The method of claim 9, wherein providing information indicating the request to establish the second session at the first QoS level comprises providing the information to a packet data function in the network of the packet-switched communication system.

12. The method of claim 11, wherein providing information indicating the request to establish the second session at the first QoS level comprises providing information including a handoff indicator and at least one of a network access identifier or an Internet address associated with the mobile unit.

13. The method of claim 12, wherein establishing the second session comprises binding the second session to the first session based upon at least one of the network access identifier or the Internet address associated with the mobile unit.

14. The method of claim 9, comprising receiving information indicative of the first session from the source access network.

15. A method for handing off a mobile unit from a source access network that operates according to a first wireless access technology to a target access network that operates according to a second wireless access technology, the mobile unit supporting multiple quality-of-service (QoS) application layer clients that operate according to multiple wireless access technologies in a packet-switched communication system, comprising:
communicating, from the source access network, with the mobile unit at the first QoS level using the first session concurrently with communications between the mobile unit and the target access network at the first QoS level using the second session; and
providing, from the source access network, information indicating a request to release the first session, the request being provided in response to receiving information indicating completion of the hand off the mobile unit to the target access network.

16. The method of claim 15, wherein providing the information indicating the request to release the first session comprises providing information including at least one of a network access identifier or an Internet address associated with the mobile unit.

17. The method of claim 16, comprising releasing the first session in response to receiving confirmation of the request to release the first session.

18. The method of claim 15, comprising providing information indicative of the first session to the target access network.

* * * * *